(12) United States Patent
Tresser

(10) Patent No.: US 7,450,723 B2
(45) Date of Patent: Nov. 11, 2008

(54) METHOD AND SYSTEM FOR PROVIDING FOR SECURITY IN COMMUNICATION

(75) Inventor: Charles P. Tresser, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 10/986,660

(22) Filed: Nov. 12, 2004

(65) Prior Publication Data

US 2006/0104450 A1 May 18, 2006

(51) Int. Cl.
*H04L 9/00* (2006.01)

(52) U.S. Cl. ............ 380/285; 380/28; 380/30; 380/46; 380/277; 380/281; 713/168; 713/169; 713/171

(58) Field of Classification Search ............ 380/285
See application file for complete search history.

(56) References Cited

U.S. PATENT DOCUMENTS

| | | | | |
|---|---|---|---|---|
| 5,247,348 A | * | 9/1993 | Israelsen et al. ............ 725/67 |
| 6,453,073 B2 | * | 9/2002 | Johnson ............ 382/239 |
| 2002/0035687 A1 | * | 3/2002 | Skantze ............ 713/168 |
| 2002/0165961 A1 | * | 11/2002 | Everdell et al. ............ 709/225 |
| 2003/0007640 A1 | * | 1/2003 | Harada et al. ............ 380/270 |
| 2003/0161469 A1 | * | 8/2003 | Cheng et al. ............ 380/217 |
| 2004/0049678 A1 | * | 3/2004 | Walsmley et al. ............ 713/168 |
| 2004/0193880 A1 | * | 9/2004 | Walmsley ............ 713/168 |
| 2005/0232148 A1 | * | 10/2005 | Curcio et al. ............ 370/230 |

* cited by examiner

*Primary Examiner*—Kambiz Zand
*Assistant Examiner*—Yonas Bayou
(74) *Attorney, Agent, or Firm*—McGinn IP Law Group, PLLC; Stephen C. Kaufman, Esq.

(57) ABSTRACT

A method (and system) of securely communicating, includes using one of a preliminary secure transmission and exchange or acquisition of secret information that provides parties with a random sequence known only to first and second parties in communication with one another, and linking one of the first and second parties with a third party. The secure transmission of the secret information is made using a channel of communication at a time when fast communication is not desired.

1 Claim, 3 Drawing Sheets

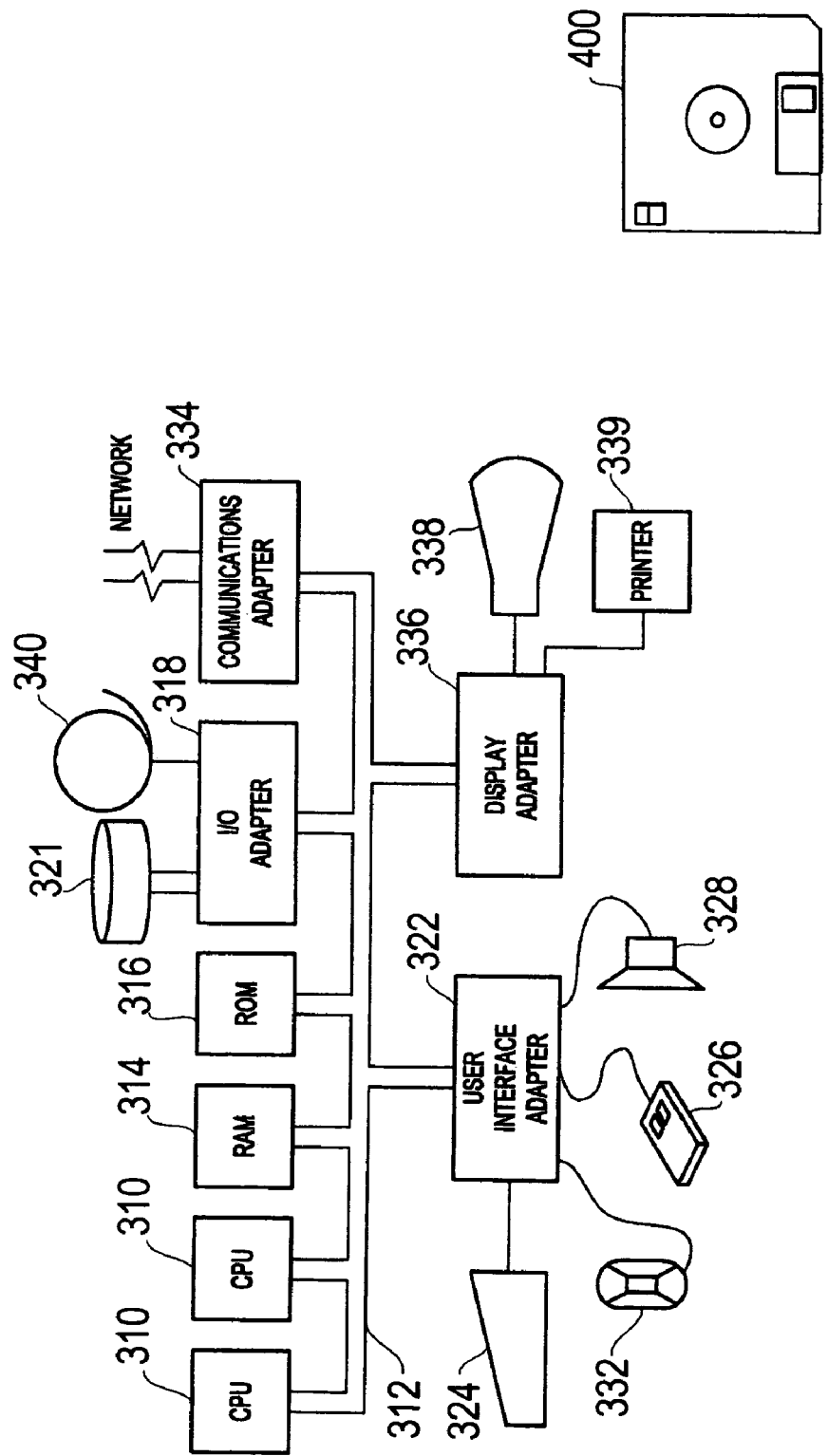

METHOD AND SYSTEM FOR PROVIDING FOR SECURITY IN COMMUNICATION

BACKGROUND OF THE INVENTION

1. Field of the Invention

The present invention generally relates to a method and system for communications and more particularly to a method and system for providing security in communication while minimizing the inconveniences that security causes in terms of a slow-down of transmissions.

2. Description of the Related Art

Prior to discussing the conventional techniques, some basic cryptography practices well-known in the art will be described.

The use of Private key/public key pairs (or SK/PK pairs; also referred to as public schemes) as means for encrypting or digitally signing a file or document, of secret encoding keys, and of secure hash functions (such as SHA-1, as fully specified in the Federal Information Processing Standard Publication 180-1) are now well known.

Additionally, symmetrical encryption systems are well-known such as DES, triple DES, etc. A description of these techniques with directions on how to use several of their implementations can be found in "Handbook of Applied Cryptography", by Alfred J. Menezes, Paul C. van Oorschot and Scott A. Vanstone, CRC Press, 1997.

To fix the ideas, a digital signature scheme is used in the form of a pair of functions Sign and $Sign^{-1}$ which are an inverse of each other (i.e., for a plain text X to be signed, $Sign^{-1}(Sign(X))=X$. The function Sign is kept secret, being known only to some legitimate owner of the signature and his/her agents. The function $Sign^{-1}$ is known publicly, and accessible for example through the World-Wide-Web (WWW) or through some agency specializing in providing PKI (Public Key Infrastructure).

Similarly, a public encryption scheme is used in the form of a pair of functions Enc and $Enc^{-1}$ which are an inverse of each other (i.e., for a plain text X to be signed, $Enc^{-1}(Enc(X))=X$. The function $Enc^{-1}$ is kept secret, being known only to some legitimate owner of the public encryption scheme and his/her agents. The function Enc is known publicly, and accessible for example through the WWW or through some agency specializing in providing PKI.

For definiteness, each time a public scheme is used, one can, for example, utilize the Rivest-Shamir-Adleman (RSA) protocol, but other methods could also be used (see, e.g., the "Handbook of Applied Cryptography").

When using a RSA protocol, currently it is preferable to use 1024 digits for X and Sign(X) (the formerly-used 512 digits are now considered not secure against modern cryptographic attacks).

Clearly, the protocol which is chosen must be known publicly if one desires to use public key cryptography. As usual in the art, it is advisable to change the keys being used periodically, depending on the application, and to keep a list of former keys.

For symmetrical encryption systems, both parties have access to the same keys to implement an agreed-upon algorithm. In some instances, the keys for the symmetrical exchange are fixed by the two parties using public key cryptography or another method computationally more expensive than symmetrical encryption such as by using a Diffie-Heliman session (which allows two parties to securely fix some common secret key using a non-secure channel of communication) at the time when a communication is initiated, or using some other form of communication such as delivery on a diskette transported by an armored carrier.

The last several years has seen an explosion of pervasive computing. Small hand-held devices now support sophisticated computational power, sufficient in particular to handle cryptographic functions. Porting such capabilities to a wireless communication system, such as for example a "smart phone," in turn enables secure communication, and in particular allows to perform both nonpayment transactions (such as stock dealing etc.) and payment. This phenomenon is expected to increase considerably the previously already fast growing domain of application of secure communications.

As alluded to above, this domain has recently begun a previous explosive growth due to the World Wide Web (WWW), and the growth rate is now expected to grow faster. Being able to ensure secure and private communication, with attributes such as authentication of the users, protection against eavesdropping, confidentiality of the correspondent identity when needed, and of the content in most cases, etc. has become particularly valuable.

Indeed, following in particular the introduction of private key cryptography (encryption and signatures), public exchange of key protocols, and efficient methods of private key cryptography, as reviewed for example in the above-mentioned "Handbook of Applied Cryptography", by Alfred J. Menezes, Paul C. van Oorschot and Scott A. Vanstone, CRC Press, 1997, methods have been developed which allow communication with all required virtues, and more and more so. Special standard protocols for electronic communication such as the Secure Socket Layer (SSL) have indeed seen wider and wider acceptance.

A major problem of all efficient methods used so far is that they all considerably slow down communication and processing of the information. In the context of wired communication network, this is burdensome but may sometimes be reasonably compensated by using more bandwidth for the communication channels.

However, this is costly even when bandwidth is available. The situation becomes much worse when going into the realm of wireless communication where augmenting the bandwidth is not a possibility, even not an expensive one (except possibly for a very small proportion of the users who would then have more bandwidth to the deficit of most other users).

Also, the fact that new methods are arithmetic-based (or combinatorics-based for a few of them) makes them eventually vulnerable as the computing power augments with time, in the sense that messages that are well protected when composed, become unprotected a few years after. This vulnerability would become much worse if the new effort to build quantum computers bears fruit.

Thus, there are problems with conventional techniques that should be remedied including that:

different channels of communication have various costs, and in particular high cost when most users need them most;

some often-used channels of communication need different urgency at different times, and the low urgency times are not being used to help better traffic;

a large amount of storage is more and more easily provided, in more and more compact form, with 1 Gigabyte of memory fitting on a very small area (e.g., a commercially-available disk having the size of a U.S. 25-cent coin is being built and sold by the present assignee), a fact that is not used to ease traffic;

in the same direction of using storage capacity to help traffic, arbitrarily long sequences can be presented in quite compact form: a pseudo-random number generator algorithm and an associated key; and using in modern ways, methods based on codebooks would allow to overcome the problem raised by the fact that new methods are arithmetic-based (or combinatorics-based for few of them) makes them eventually vulnerable.

SUMMARY OF THE INVENTION

In view of the foregoing and other problems, disadvantages, and drawbacks of the conventional methods and structures, an exemplary feature of the present invention is to provide a method (and system) for secure communication.

Another exemplary feature is to provide a method (and system) to communicate securely with very small (minimal) impact on the time needed to process the communication and without changing the bandwidth of the communication channel.

Generally, with the invention, a desired level of security is used to communicate secret random sequences of bits between correspondents which often communicate with each other with essentially any preferred secure method of communication, and using either cheaper channels than the ones they typically use, or the one(s) that they usually use at times they have no information to exchange, and in any case before using these random streams.

Thus, with the invention, party A will securely send to party B streams of random bits, on a physical support (or on any other kind of channel including up to sophisticated ones using quantum cryptography), or the usual preferred channel of communication between A and B but at a time when communication is relatively "cheap" (inexpensive).

In a first aspect of the present invention, a method (and system and signal-bearing medium) of securely communicating, includes using one of a preliminary secure transmission and exchange or acquisition of secret information that provides parties with a random sequence known only to first and second parties in communication with one another, and linking one of the first and second parties with a third party. The secure transmission of the random sequence is made using a channel of communication at a time when fast communication is not desired.

In a second aspect of the present invention, a method (and system) to communicate securely, includes using preliminary secure transmission or another exchange or acquisition of secret information that provides parties with random sequence known only to two parties that are in direct communication, and which is usable as a codebook, and linking two parties other than those said parties that share the secret information, through a third party which is the second party of a sharing pair of parties. The codebook is communicated using a computer at a time of relatively cheap communication, and strings of secret bits are provided to a second computer to communicate at a time of expensive communication with a third computer.

In a third aspect of the present invention, a system for securely communicating, includes a smart phone that uses one of a preliminary secure transmission and exchange or acquisition of secret information that provides parties with a random sequence known only to first and second parties in communication with one another, and a communication link which links one of the first and second parties with a third party. The secure transmission of the random sequence is made using a channel of communication at a time when fast communication is not desired.

In a fourth aspect of the present invention, a system for securely communicating, includes means for using one of a preliminary secure transmission and exchange or acquisition of secret information that provides parties with a random sequence known only to first and second parties in communication with one another, and means for linking one of the first and second parties with a third party. The secure transmission of the random sequence is made using some channel of communication at a time when fast communication is not desired.

In a fifth aspect of the present invention, a communication method, includes using cryptography to prepare a codebook for low overhead, secure communication using a predetermined fast channel, at a time when a cost of communication is less than that of a communication at a predetermined time including a peak time.

In a sixth aspect of the present invention, a method of deploying computing infrastructure in which computer-readable code is integrated into a computing system, such that the code and the computing system combine to perform a method including: developing a business out of selling a codebook built on a standardized format for use during a fast secure communication, the codebook being built and communicated to a customer during a time when a communication cost is less than that at a time of the fast secure communication.

With the unique and unobvious aspects of the present invention, parties can communicate securely with very small impact on the time needed to process the communication and without changing the bandwidth of the communication channel.

The invention also allows to easily utilize in modern ways methods that are based on codebooks that allow to overcome the problem raised by the fact that new methods are arithmetic-based (or combinatorics-based for a few of them) which makes them eventually vulnerable.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 3 illustrates an exemplary hardware/information handling system 300 for incorporating the present invention therein; and FIG. 4 illustrates a signal bearing medium 400 (e.g., storage medium) for storing steps of a program of a method according to the present invention.

DESCRIPTION OF EXEMPLARY EMBODIMENTS OF THE PRESENT INVENTION

Figure 1:
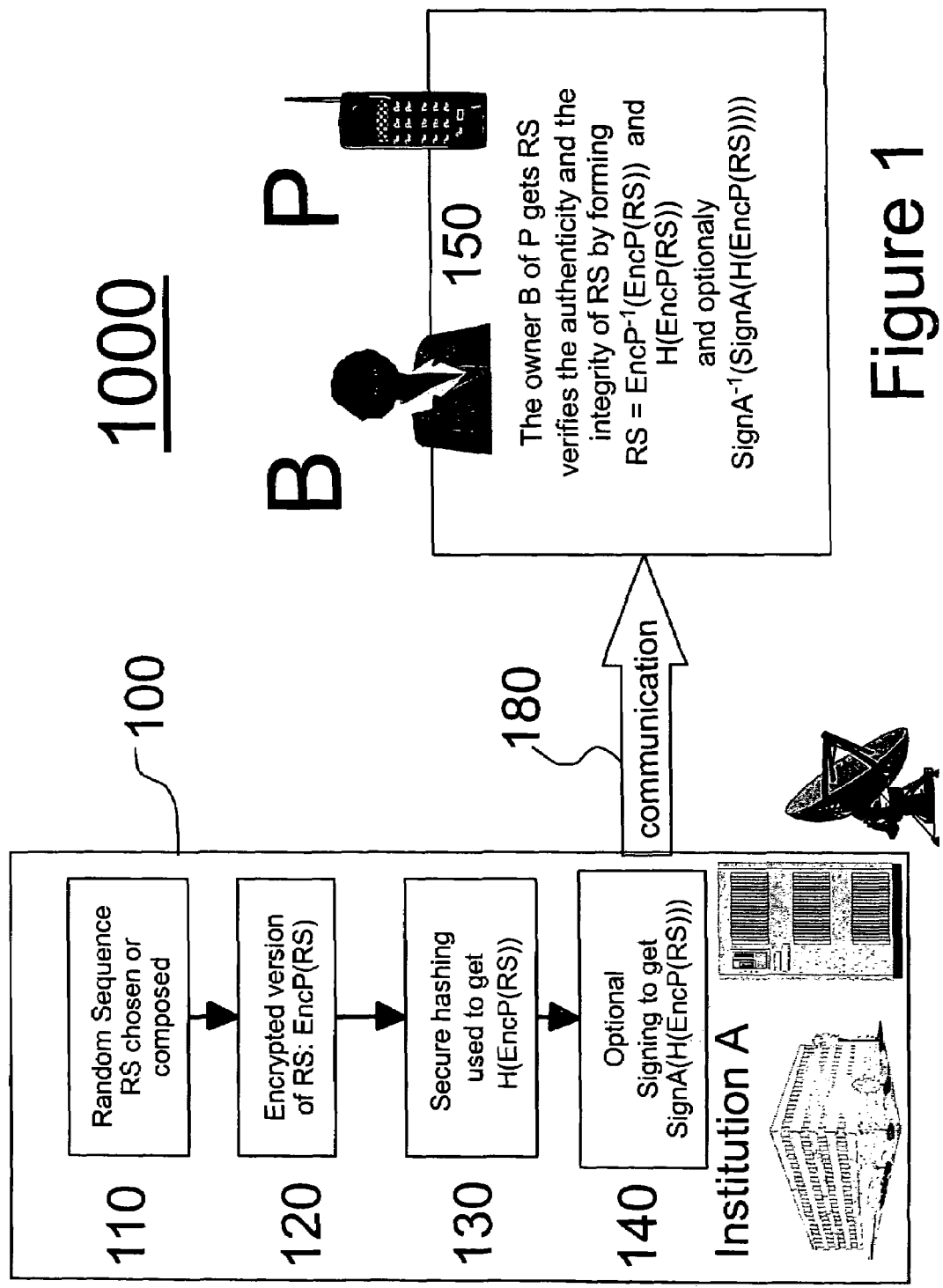
FIG. 1 shows a flow diagram of a particular implementation 1000 of the present invention in a preparation stage.

Turning to FIGS. 1-4, a detailed description of an exemplary embodiment according to the present invention will be described.

As mentioned above, with the invention, a desired level of security is used to communicate secret random sequences of bits between corresponding parties that often communicate with each other with essentially any preferred secure method of communication. Preferably, such communication is performed using either cheaper channels than the ones typically used, or the channel that the parties usually use at times when they have no information to exchange (and in particular, as much as possible, at times when the lines are not saturated and the cost of transmission is objectively lower, or at least reasonably expected to be cheaper, than at peak times), and in any case before using these random streams.

Thus, party A can securely send to party B streams of random bits, on a channel (e.g., a physical support, or on any other kind of channel) including the usual preferred channel of communication between A and B, but at a time when communication is relatively inexpensive.

Hereinbelow is provided an example of the structure of the string that can be sent, in the form that such string(s) may have before any security protocol is used to protect them if needed (e.g., as in the case these strings are sent over a non-secure channel).

Such streams should preferably be cut into fixed length sequences of the form:

(N1$j$, N2$j$, . . . , Nmj, k1$j$,k2$j$,k3$j$, . . . , knj), where each of (N1$j$, N2$j$, . . . , Nmj) stands for a sequence recognizable by party A and party B as representing the number j, and (k1$j$,k2$j$,k3$j$, . . . knj) stands for the $j^{th}$ sequence of n consecutive random bits.

Then, when party B wants to send to user A message MessClear=(M1$j$,M2$j$,M3$j$, . . . Mnj), where Mkj is the $k^{th}$ block of length n of MessClear, it just needs to send, with no further encryption, the message Code1(Mess Clear) Code2(Mess Clear) . . . Code(last) (Mess Clear), where:

Codej(Mess Clear) (N1$j$, N2$j$, . . . , Nmj, M1$j$-k1$j$,M2$j$-k2$j$, M3$j$-k3$j$, . . . , Mnj-knj), where subtraction is supposed to take place in the finite field Z/2Z (i.e., the conventions used are:

1-1=0, 1-0=1, 0-1=1, 0-0=0).

When it receives Codej(Mess Clear), party A recognizes from the symbolic sequence N1$j$, N2$j$, . . . , Nmj the number j, and hence knows that the $j^{th}$ sequence of n consecutive random bits(k1$j$,k2$j$,k3$j$, . . . knj) should be used to decrypt the j-coded message the $j^{th}$ block of length n M1$j$-k1$j$,M2$j$-k2$j$,M3$j$-k3$j$, . . . , Mnj-knj, of the coded message. In fact, this is performed simply by adding the sequences (k1$j$,k2$j$,k3$j$, . . . knj) and (M1$j$-k1$j$,M2$j$-k2$j$,M3$j$-k3$j$, . . . , Mnj-knj) term-by-term in Z/2Z.

For better efficiency, it is expected that in general, n (which stands for the length of the blocks) will be considerably larger than m (which stands for the length of the random sequences that represent the numbers 1, 2, . . . that index the successive blocks). In fact, m is the overhead (the extra cost for coding using the inventive method over not encrypting at all) per block of length m since the blocks have the same length. Typically, for unspecialized communications where messages that hold in books of up to 1000 pages of standard text, n represents the length of the content of a page, while m=10, so that a sequence of m random bits represents one of 1024 numbers, while n will represent the length of the content of a typical chapter for much longer communications.

Alternatively, one can use the classical means for using codebooks, but these usually necessitate longer (larger) overhead. Other means of respecting the spirit of codebooks could be preferred for a variety of reasons, and thus such other means could be used by the present invention.

Generally, when two parties communicate together, such communication is performed through some installation belonging to a communication service provider or a collection of service providers working in association (e.g., a telephone company and several network owners, etc.).

Thus, even if parties A and C only communicate for the first time, they most probably have had frequent interaction with communication provider B. Hence, the communication between A and C can be decomposed into communications between A and B and between B and C. For each of these two communications, one can use the principles of the invention. However, a problem arises in that neither A nor C wants B to know their secrets. This is easily fixed when B uses secure hardware (e.g., such as the IBM® 4758 PCI Cryptographic Coprocessor) whose level of security is trusted by A and C. Hence, anyone can be sure that B is a relay that can handle and provide service around cryptography without letting anyone, including its owner, have access to the secrets.

Thus, it is enough to understand the case of a central institution A and a private or institutional party B to have a full appreciation of the invention and the general situation, as other scenarios decompose into pieces that are somewhat similar.

It is also noted that the roles of two parties that communicate with each other is usually quite asymmetrical.

For example, A may often need to have quick access to B, and needs to have such quick access through limited bandwidth, while B may rarely (or never) need to contact A rapidly.

Thus, the present invention may provide one-way implementations (and/or two-way implementations). For purposes of the present invention, "one-way implementation" means that one party often sends a message to the other (second) party, while the second party mostly receives messages from the first one and seldom sends messages to the first one. Both parties still use the present invention as both need to have access to the codebook, be it to encrypt or decrypt messages.

The general design of two-way implementations of the present invention can be done by using the same form of implementation of the present invention in both directions (e.g., A to B and B to A), or by using different implementations in the two directions.

A simple example of "one-way implementation" is a security firm that would send alerts and advice to its customers, the other direction of communication being the customer sending buy or sell orders and questions to their own brokers working for that firm. Asymmetrical communication lines may be preferred to a two-way encryption scheme since buy/sell orders are more sensitive than alerts or anyway more so than advices. In fact, one could use a symmetric channel for alerts and orders, while advices and questions would use a less secure channel.

To keep the focus on the feature(s) of the present invention, there has been no discussion of how to use Error Correcting Codes (ECCs). However, the use of such technologies is well known in the art of digital communication (e.g., see G. C. Clark and J. B. Cain: "Error Correcting Coding", Plenum Press, New York, 1981 or F. J. Macwilliams and N. J. A. Sloane, "The Theory of Error Correcting Codes" (North-Holland Mathematical Library ; V. 16), (North-Holland; Amsterdam, 1977).

The present invention complements and can use modern, number theory-based, cryptography. Modern cryptography is characterized by the introduction of computational methods that allow considerable ease of use. Nevertheless, no method is considered as secure as the classical method of sharing a codebook. Indeed, this classical method cannot be broken except by having access to the codebook. The most sensitive messages are still exchanged this way, such as when two financial institutions, or two agents of a government, military, or civil agency, exchange physically a codebook.

In view of this classical state of the art, the present invention can be described as using modern technology to:

either package compactly and cheaply such a "codebook" (or generating an algorithm thereof) (e.g., in the form of a "smart card") that a bank customer may buy from (or be given by) his/her bank, directly or from a third party vendor (grocery store, hardware merchant, etc.).

In the latter case, the secure communication may be provided by some service provider which would preferably use secure hardware such as the IBM® 4758 PCI Cryptographic Coprocessor to serve as an intermediary between two parties, one of which uses the invention to lower its own secure communication bills. The smart card (or other physical support) preferably carries serial numbers (or other indicia such as alpha-numeric characters, etc.) that would then allow the third party to know which codebook to match with the buyer or other recipient of that codebook; or communicate the codebook using modern cryptography. For example, by letting a "smart phone" stay on line while charging its batteries, or more generally letting a computer (e.g., any device with computing capabilities, regardless of whether these capabilities are explicitly accessible or not to the users of the device) obtain, at a time of relatively cheap communication, strings of secret bits from a second computer, which would allow to communicate at a time of relatively expensive communication with a third computer (either a different computer or it could be second computer itself); or a combination of both.

Herein, the terms time of cheap communication and time of expensive communication (or the like) are used in a broad sense.

By the same token, it may not necessarily mean that the end users would indeed pay different prices to communicate at those different times. While one expects the actual price in dollar ($) amount to be different for some party (e.g., the parties operating the communication networks that are involved), this is not necessarily the case, and these terms are used to differentiate a time of lower-than-average traffic from a time with a higher-than-average traffic.

In the case, for example, of a customer communicating with a financial institution, besides all content exchange which would be performed using such a pre-shared dictionary, an authentication of the originator of the message could be done using other means, such as a public key signature, to avoid exposing the customer to a dishonest employee of the bank. However, such marginal recourse to computationally intense cryptography at a time of expensive communication can also be avoided if the bank uses secure hardware to protect all critical secrets.

The low cost for security provided by the invention makes it a good candidate to use in traffic simulation to beat traffic monitoring by adverse parties. Such traffic monitoring is often used to deduce information from the pattern and/or timing of messages. For example, eavesdropping on the traffic between banks may help guess the level of activity or the number of operational losses. The classical defense is to use a lot of bogus messages, and thus, the benefit of a low overhead in the encryption of all messages.

Incidentally, for purposes of the present application, a "smart card" means a non-duplicable card carrying some alpha-numerical information different from one card to another.

It is noted that, by using some zero-knowledge protocol or the like, a Smart card can be authenticated but cannot be duplicated, and the authentication may have no access to some of the information stored in the Smart card, while this information can be used during the usage of the Smart card, to generate other information. This property is what the present inventors consider to be the characterization of a smart card, for purposes of the present application.

Accordingly, in the present disclosure, any electronic component with these properties and with some memory and/or some processing capabilities, will be called "a smart component" or "a Smart card", even if it does not actually take any form resembling a "card". A general reference to Smart card technology and applications can be found in "Smart Cards: A Guide to Building And Managing Smart Card Applications" by Henry Dreifus and J. Thomas Monk, John Wiley & Sons, 1998.

Preliminary Setup: Sending Codebooks when Communication is Cheap.

Hereinbelow will be considered the exemplary case of a smart phone P (i.e., a phone that is a computer in the sense defined previously), equipped with a smart card that supports:

a private part $EncP^{-1}$ of a public encryption scheme; and
a private part SignP of a public signature scheme, and preferably has sufficient computational power to support these schemes and the public (verification) part of public encryption and signature schemes.

The owner B of "smart phone" P selectively desires to establish regular communication with institution (party) A which possesses:

a private part $EncA^{-1}$ of a public encryption scheme; and
a private part SignA of a public signature scheme.

Phone P and institution A exchange the public parts of their public protocols (e.g., the public signature and the public encryption) by any of a variety of methods, well-known to anyone ordinarily skill in the art of using cryptography for secure communication.

With reference now to FIG. 1, a method 1000 is shown according to the present invention.

In FIG. 1, on the side 100 of the institution A in which communication is being prepared with phone P, at times when phone P is not used to communicate with any party, in step 110, institution A chooses or composes random sequence RS (e.g., a random sequence of bits) for phone P. It is noted that a plurality of random sequences (or "patches") could be prepared depending upon the level of security desired (e.g., the more sets of random sequences prepared, the higher the security provided).

In step 120, the random sequence(s) 110 is encrypted using EncP that is publicly known (or at least known to Institution (Party) A) to form EncP(RS).

In step 130, a secure hash function H, such as the Secure Hash Algorithm (SHA-1) or the like, is used to form a secure hash H(EncP(RS)) of EncP(RS). It is noted that it is expected that the total length of RS (hence of EncP(RS)), would be too large for the invention to be of any practical use. However, this need not be the case. However, if so, then the hash function has great utility. It is noted that the hash function is used so that owner B knows that the random sequence came from the correct source (e.g., the correct party).

Thus, to ensure security, private key/public key pairs (also referred to as "public encryption schemes") and secure hash functions (such as the Secure Hash Algorithm (SHA-1)) may be advantageously employed by the present invention.

As mentioned above, the use of private key/public key pairs, of the Information Dispersal Algorithm (IDA), and of secure hash functions are well known. A description of these techniques and some of their implementations can be found in "Handbook of Applied Cryptography", by Alfred J. Menezes, Paul C. van Oorschot and Scott A. Vanstone, *CRC Press*, 1997 and in "Cryptography, Theory and Practice" by Douglas R. Stinson, *CRC Press*, 1995.

For example, in an exemplary implementation, each time a private encryption scheme is used, one can choose the Rivest-Shamir-Adleman (RSA) protocol, described in U.S. Pat. No. 4,405,829, incorporated herein by reference, as a method to generate and use a SK/PK pair to allow for public encryption.

Additionally or alternatively to the above method, other methods could also be used (see, e.g., the above-mentioned "Handbook of Applied Cryptography").

In step 140, the secure hash H(EncP(RS)) is signed (e.g., a digital signature) using SignA to form SignA(H(EncP(RS))).

Then, Institution A can communicate with owner (party) B by either sending EncP(RS) and SignA(H(EncP(RS))), or by sending EncP(RS) and H(EncP(RS))) to party P in step 180 of the method of the present invention. Preferably, the signature would be used if one needs to control who originated the sequences. Hence when high(er) security is desired, further security enhancing methods can be used as are described below, all being well known to those ordinarily skilled in the art. It is noted that such can be communicated in one (or more) communication sessions. For greater security, a plurality of communication sessions could be employed to communicate portions of EncP(RS) and SignA(H(EncP(RS))) (or EncP (RS) and H(EncP(RS))).

Next, to verify the authenticity and the integrity of the random sequence(s) (RS), in step 150, party B preferably uses phone P (or possibly some alternate device). In a preferred embodiment, all of these operations can be performed automatically by phone P, and owner B may not even know that the invention is being used. As such, the invention could be transparent to the owner B.

In any event using phone P or another device, party B may use:

1) SignA$^{-1}$ which is publicly known (or at least known to party B), to optionally form
   SignA$^{-1}$[SignA(H(EncP(RS)))]=H(EncP(RS))

(if SignA has been used by institution A at step 140 as an extra protection);

2) EncP$^{-1}$ which is known to B only, to form
   EncP$^{-1}$[(EncP(RS))]=RS; or 3) H in conjunction with the received EncP(RS) to form H(EncP(RS)).

It is noted that the above three operations can be performed in combination for maximum security.

In any event, using the H(EncP(RS)) that party B has computed (with or without the use of SignA$^{-1}$ which, as mentioned above, provides non-mandatory extra security), party B can now compare the computed H(EncP(RS)) with the received H(EncP(RS)) to verify both:

the authenticity of RS (i.e., the fact that RS has been sent by institution A for the intended usage of easily securing further communications, particularly at time of expensive communication); and the integrity of the random sequence(s) (RS), the integrity being essential to use RS for later secure communication.

Thus, the phone has been set up (e.g., the owner receives the random sequence) during a time when the bandwidth is cheap (inexpensive). Thus, the phone is set up for later, secure communication at more expensive times. Thus, with the setting up of the phone, during the above described one-time pass, for communication the invention is now ready to use, the set-up later during selected times such as when the communication is expensive.

Fast Communication Sequence

Figure 2:
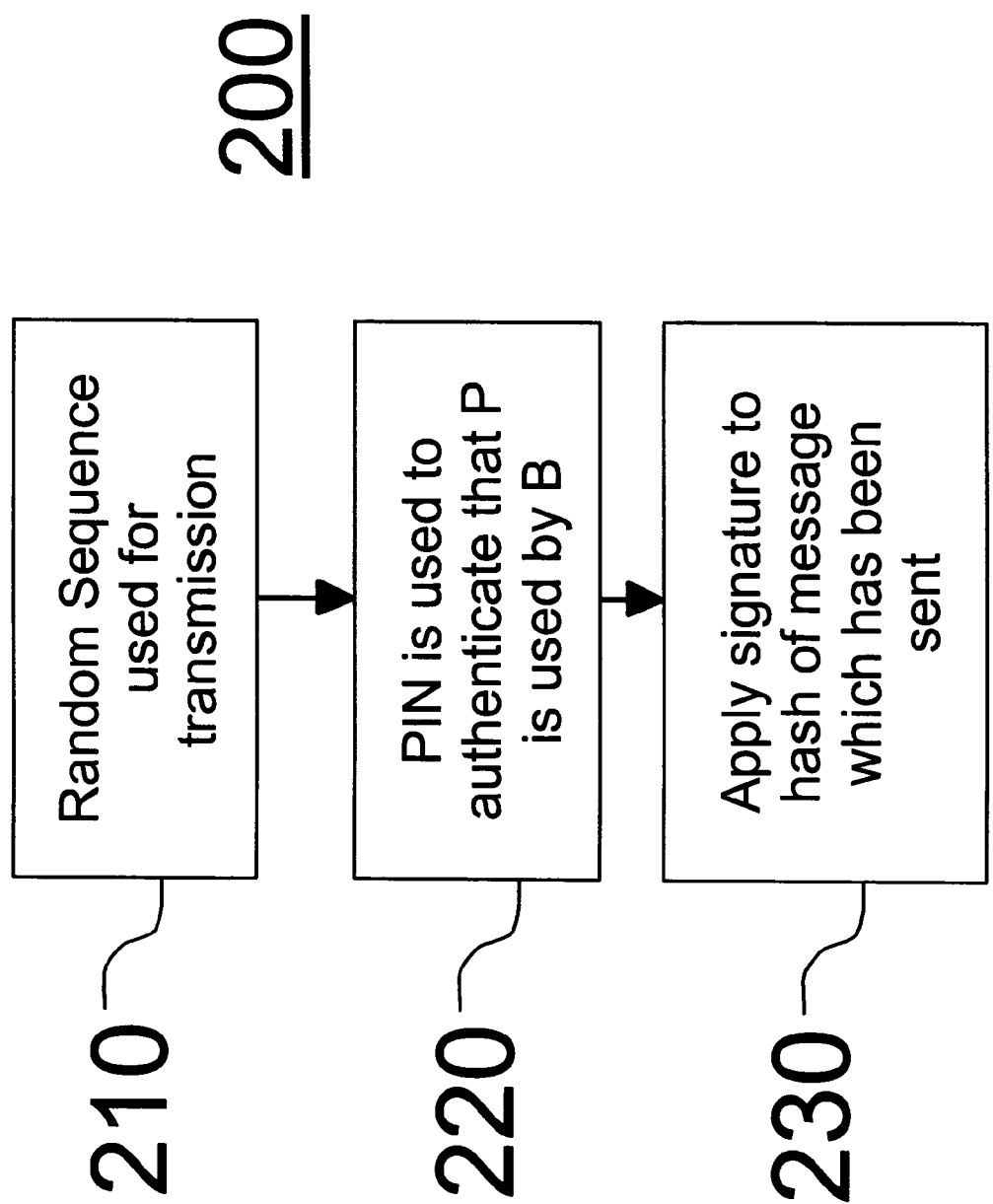
FIG. 2 shows a flow diagram of a particular implementation 200 of the present invention in a rapid secure communication stage.

Turning now to FIG. 2, a method 200 of communication is shown according to the invention. Method 200 can be used after the phone P has been set up and established during a relatively cheap communication time, for later more secure communication, as described above.

In step 210, when party B using phone P desires to send a message to institution A, phone P uses the random sequence that is obtained as RS=EncP$^{-1}$(EncP(RS)), for example as indicated above in reference to FIG. 1.

Then, in step 220, party B authenticates that party B is indeed in possession of P, by sending, for example a personal identification number (PIN) number or the like. Other authentication techniques could be alternatively used such as recourse to biometrics in lieu of, or in conjunction with, a PIN.

Optionally, in step 230, SignP can be applied to a secure hash of the message that has been transmitted, to guarantee that the random sequence (RS) has not been extracted from phone P by some unauthorized means. It is noted that it is difficult (if at all) to determine that RS has been extracted by some unauthorized entity, and hence the possible recourse to the extra protection of a signature.

In case phone P does not contain enough random sequences sent by institution (party) A, it will communicate, for example, using a combination of SignP and EncA as is well-known in the art, and then will have to incur (e.g., deal with) the security overhead in transmission time as usual.

FIG. 3 illustrates a typical hardware configuration of an information handling/computer system for use with the invention and which preferably has at least one processor or central processing unit (CPU) 311.

The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., and a display adapter 336 for connecting the bus 312 to a display device 338 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 311, as represented by the fast-access storage for example. Alternatively, the instructions may be contained in another signal-bearing media, such as a magnetic data storage diskette 400 (FIG. 4), directly or indirectly accessible by the CPU 311.

Whether contained in the diskette 400, the computer/CPU 311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Additionally, it is noted that the invention could be provided as a business service such as a method for providing secure communication and specifically a method of paying for secure communications at a time when such communications costs less. Such a business service could be provided to the user over a network such as one of those discussed above.

With the unique and unobvious features of the present invention, a novel method and apparatus are provided for method (and system) for secure communication. The invention allows secure communication with minimal impact on the time needed to process the communication and without needing to change the bandwidth of the communication channel.

With the invention, a desired level of security is used to communicate secret random sequences of bits between correspondents which may often communicate with each other, and allows the parties to use either cheaper channels than the ones they typically use, or the one(s) that they usually use at times they have no information to exchange, and in any case before using these random sequences.

Thus, party A securely sends to party B streams of random bits, on a channel (e.g., a physical smart card or the like, or sophisticated channels such as those using quantum cryptography), or the usual preferred channel of communication between A and B, but at a time when communication is relatively "cheap" (inexpensive). In this way, the user need only pay for security when it is needed.

While the invention has been described in terms of several exemplary embodiments, those skilled in the art will recognize that the invention can be practiced with modification within the spirit and scope of the appended claims. Further, it is noted that Applicant's intent is to encompass equivalents of all claim elements, even if amended later during prosecution.

The invention claimed is:

1. A method to communicate securely, comprising:

using preliminary secure transmission or another exchange or acquisition of secret information that provides parties with a random sequence known only to two parties that are in direct communication, and which is usable as a codebook;

linking two parties other than those said parties that share the secret information, through a third party which is the second party of a sharing pair of parties;

on a second party side, preparing communication at a time of relatively cheap communication when said phone is not used to communicate with any party, said second party chooses or composes a random sequence of bits, to said phone;

encrypting the random sequence using EncP which is one of publicly known and at least known to said second party to form EncP(RS);

using a secure hash function H to form a secure hash H(EncP(RS)) of EncP(RS);

digitally signing the secure hash H(EncP(RS)) using SignA to form SignA(H(EncP(RS)));

sending one of EncP(RS) and SignA(H(EncP(RS))), and EncP(RS) and H(EncP(RS)), to communicate from said second party to said first party;

verifying an integrity of the random sequence by said first party using said phone; and communicating between parties, said communicating comprising:

when said first party using the phone desires to send a message to said second party, said phone uses the random sequence (RS) that is obtained as RS=EncP$^{-1}$(EncP(RS));

authenticating, by said first party, that party is in possession of the phone, by sending a predetermined number; and optionally applying SignP to a secure hash of the message that has been transmitted, wherein the codebook is communicated using a computer at a time of relatively cheap communication, and strings of secret bits are provided to a second computer to communicate at a time of expensive communication with a third computer, wherein said first party is implemented with a smart phone equipped with a smart card that supports a private part EncP$^{-1}$ of a public encryption scheme, and a private part SignP of a public signature scheme, wherein said first party selectively establishes regular communication with a second party which includes a private part EncA$^{-1}$ of a public encryption scheme, and a private part SignA of a public signature scheme, wherein said phone and said second party exchange the public parts of their public signature and the public encryption, wherein said communicating is performed in a plurality of communication sessions, wherein said verifying is performed automatically by said phone and transparently to said first party, wherein said first party performs at least one of:

if SignA has been used by said second party, using SignA$^{-1}$ which is publicly known or at least known to said first party, to optionally form SignA$^{-1}$[SignA(H(EncP(RS)))]=H(EncP(RS));

using EncP$^{-1}$ which is known to said first party only, to form EncP$^{-1}$ [(EncP(RS))]=RS; and using H in conjunction with the received EncP(RS) to form H(EncP(RS)), wherein if said phone does not contain enough random sequences sent by said second party, said phone communicates using a combination of SignP and EncA, wherein said secure hash function comprises SHA-1, wherein said smart phone uses one of a preliminary secure transmission and exchange and acquisition of secret information that provides parties with a random sequence known only to first and second parties in communication with one another, wherein a communication link links one of said first and second parties with a third party, wherein said secure transmission of said random sequence is made using a channel of communication at a time when fast communication is not desired, and wherein said random sequence comprises a fixed length sequence of the form (N1j, N2j, . . . , Nmj, k1j, k2j, k3j, . . . , knj), where (N1j, N2j, . . . , Nmj) comprises a sequence recognizable by said first party and said second party as representing a number j with m as a number of random bits, and (k1j, k2j, k3j, . . . , knj) comprises a j amount of sequences for an n number of consecutive random bits.

* * * * *